Jan. 8, 1946. A. F. JENKINS 2,392,386
TORCH TIP
Filed Jan. 11, 1945
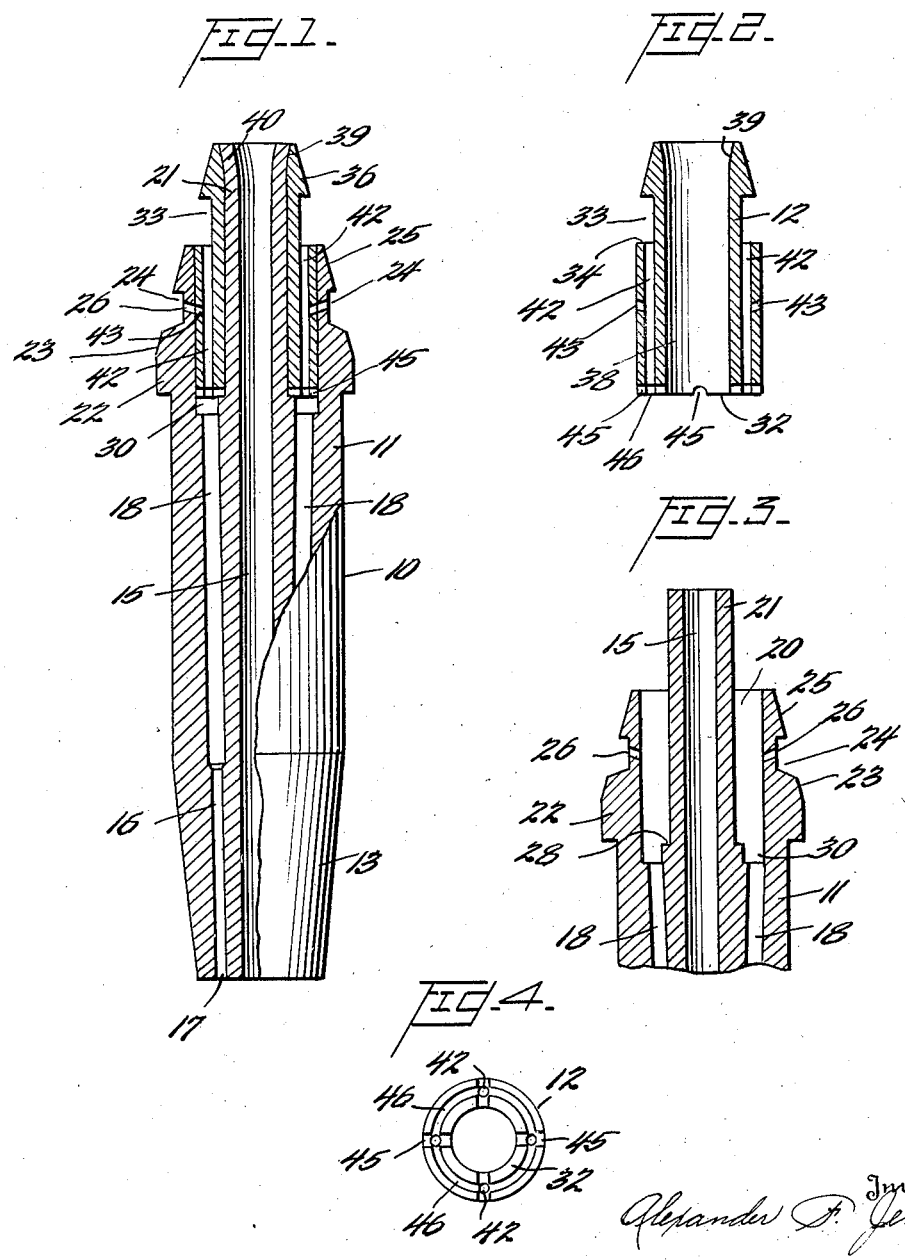

Patented Jan. 8, 1946

2,392,386

UNITED STATES PATENT OFFICE 2,392,386

TORCH TIP

Alexander F. Jenkins, Baltimore, Md., assignor to The Alexander Milburn Company, Baltimore, Md., a corporation of Maryland Application January 11, 1945, Serial No. 572,396

5 Claims. (Cl. 158—27.4)

This invention relates to blowpipes or torches of the type using burning gases for cutting, welding, and other purposes.

This application is a continuation-in-part of my copending application, Serial No. 520,801, filed February 2, 1944.

The general object of the invention is to provide novel and improved torch tips which may be easily and economically constructed and maintained in service, which are not likely to foul up, and which will not flash back even under conditions of operation most conducive to that annoying and dangerous contingency.

In prior torch tips, difficulty has been experienced in insuring that all of the multiple passageways for the heating gases are of uniform size, shape, and capacity. Such fine passageways are employed in these tips for introducing and mixing the gases that small burrs left from the drilling operation, or particles of dirt, often cut down the capacity of one or more of the passageways and thus alter considerably the nature of the resulting flame. One of the features of the present invention involves novel provisions for equalizing the flow of the gases issuing from the tip even though one or more of the inlet passageways are obstructed, even to the extent of being completely stopped up.

A further object is to provide a novel and improved insertible part containing all of the minute passageways located at the rear end of the tip, whereby all of the machining and finishing of the more intricate portions of the tip at that end may be done before assembly and with greater facility.

A still further object is the provision of novel and effective injection and mixing means which affords a more thorough mixing of the oxygen and combustible gases and also improves the equalizing and anti-flashback qualities of the tip.

Other objects and features of novelty will be apparent from the following specification when read in connection with the accompanying drawing in which one embodiment of the invention is illustrated by way of example.

In the drawing:

Figure 1 is a view partly in elevation and partly in longitudinal section of a torch tip embodying the principles of the invention;

Figure 2 is a similar sectional view of the insert applied to the rear end of the body portion of the tip, and providing the fine injection passageways in which the initial intermingling of the gases takes place;

Figure 3 is a similar view of the recessed rear end of the body portion of the tip adapted to receive the insert; and Figure 4 is a view in end elevation of the insert member.

The novel torch tip illustrated in the drawing is designated generally by the reference numeral 10 and comprises in its preferred form a main body portion 11, the rear end of which is shown in Figure 3, and a tubular insert member 12, shown in section in Figure 2 of the drawing.

The body portion 11 is generally cylindrical but may be tapered as at 13 near the forward or discharge end and is provided adjacent the rear end with annular grooves and shoulders whereby the inlet portion is adapted to the conventional conical socket provided in the torch head. The body portion 11 is provided with the axial oxygen passageway 15 which extends from one end to the other of the tip. Surrounding this central oxygen passageway is a series of gas passageways 16 whereby the mixture of oxygen and combustion gas may be fed to the outlet orifices 17 at the forward end of the tip. Centrally of the tip the gas passageways 16 are enlarged as at 18 to provide expansion chambers for these gases.

As best shown in Figure 3 of the drawing the body portion 11 is provided with an an annular recess 20 surrounding the elongated central tubular projection 21 through which the oxygen passageway 15 opens rearwardly of the tip. The outer surface of the rear portion of the tip is provided with the annular raised shoulder 22. The rearward edge of the shoulder 22 is bevelled or tapered as at 23 and the rear portion of the tip is also provided with an annular groove 24 beyond which is a further tapered shoulder 25. At the bottom of the annular groove 24 inclined passageways 26 lead into the recess 20.

At the bottom of the large recess 20 there is formed an annular shoulder 28 which defines the upper limit of a chamber 30 from which the passageways 18 extend toward the forward portion of the tip.

The insert member 12 has a substantially cylindrical forward portion which is adapted to be forced snugly into the recess 20 in the body portion 11. The forward end face 32 of the insert 12 is stopped by the shoulder 28 and provides the rearward boundary of the annular chamber 30. The rear portion of the insert 12 is provided with an annular groove 33 the forward shoulder 34 of which is co-terminous with the rear end of the annular raised portion or shoulder 25 of the body portion 11, as shown very clearly in Figure 1 of the drawing. The extreme rear end of the insert 12 is provided with a bevelled ridge or shoulder 36 which corresponds in taper with the portions 23 and 25 of the main part 11. These tapered conical shoulders fit snugly within correspondingly tapered portions of the torch head socket and the grooves 24 and 33 register respectively with oxygen and combustible gas passageways in the torch head.

The rear portion of the central opening 38 of the insert 12 is flared as at 39 and when the insert is firmly seated within the recess 20 of the body portion 11 the tubular extension 21 of the body portion is spun or swayed outwardly to fit the flared part 39 as clearly shown at 40 in Figure 1.

Leading forwardly from the gas inlet groove 33 in the insert 12 is a series of fine inlet passageways 42, each of these passageways having an inclined cross passageway 43 therein registering with the oxygen passageways 26 leading from the groove 24. This provides injection means for initiating the mixture of the oxygen and combustible gas. The passageways 42 lead forwardly through the front face 32 of the insert 12 and thus into the annular equalizing and mixing chamber 30, from which the passageways 16, 18 lead to the discharge orifices 17 of the tip.

It will thus be seen that should any of the inlet passageways 26, 42, or 43 be clogged or obstructed, the remaining passageways will supply gases to the equalizing chamber 30 from whence substantially equal supplies of gas will be distributed to the outlet passageways 16, 18. Additional advantages of this broad provision have been described in the prior application to which reference has been made.

One of the principal features of the present invention is the provision of certain recesses or grooves in the front face 32 of the insert 12 which provides the rear wall of the equalizing chamber 30. Substantially radial grooves 45 are cut into this face so as to intersect the points where the passageways 42 open into the chamber 30. It has been found that the provision of these grooves or channels 45 improves the operation of the tip provided with the annular equalizing chamber 30. The applicant does not claim to know the theory underlying the increased effectiveness of the novel tip, but it is believed that the grooves function to provide a slight individual expansion for the gases passing from the bores or passageways 42 into the equalizing chamber. It is also possible that this feature provides more efficient mixing at this point where considerable turbulence is created, and where the grooves not only provide additional expansion means, but also give rise to eddy currents.

Although the radial grooves 45 increase the efficiency of this tip to some extent, it has been found that the provision of an annular groove 46 intersecting the radial grooves 45 at points coinciding with the openings of the passageways 42, further increases the effects described. Although the provision of a complete annular groove 46 is desirable from a manufacturing standpoint and also to provide a continuous circular passageway supplementing the chamber 30, it is contemplated within the broad provisions of the invention that any sort of intersecting groove may be provided adjacent the points of intersection, and need not necessarily be continuous.

For the purposes of the present invention, the tip need not necessarily be of the conical shank type but may have a flat transverse plane of junction with the torch head. Also, the passageways 42 and 16, 18 need not be in alignment but may be offset from each other around the chamber 30.

Various other changes and modifications may be made in the embodiments illustrated and described herein without departing from the scope of the invention as defined in the following claims.

Having thus described the invention, what is claimed as new and desired to be secured by Letters Patent is:

1. A torch tip of the class described comprising, in combination, a main body portion provided with an axial oxygen passageway, and an annular series of combustion gas passageways opening through discharge orifices in the front end of the tip, an annular recess formed in the rear end of the tip body from which said gas passageways lead, an annular insertable member fitting snugly within the recess but terminating short of the forward end thereof whereby an annular chamber is provided forwardly of the member, said member being provided with a series of gas admission passageways discharging into said chamber whereby the distribution of gases from said admission passageways to the gas passageways in the tip body portion may be equalized, and a series of substantially radial grooves formed in the forward face of said insertible member, each of said grooves intersecting one of the discharge openings of said gas admission passageways.

2. A torch tip of the class described comprising, in combination, a main body portion provided with an axial oxygen passageway, and an annular series of combustion gas passageways opening through discharge orifices in the front end of the tip, an annular recess formed in the rear end of the tip body from which said gas passageways lead, an annular insertible member fitting snugly within the recess but terminating short of the forward end thereof whereby an annular chamber is provided forwardly of the member, said member being provided with a series of gas admission passageways discharging into said chamber whereby the distribution of gases from said admission passageways to the gas passageways in the tip body portion may be equalized, a series of substantially radial grooves formed in the forward face of said insertible member, each of said grooves intersecting one of the discharge openings of said gas admission passageways, and an annular groove in said face intersecting said radial grooves and all of said discharge openings.

3. A torch tip of the class described comprising an elongated metal member having means at the rearward end thereof for attachment to a torch body through which oxygen and combustible gas may be fed to the tip, an axial oxygen passageway extending throughout the length of the tip, an annular series of combustion passageways in the forward portion of the tip and opening through discharge orifices in the front end of the tip, an annular series of gas inlet passageways in the rearward or shank portion of the tip, an annular chamber within the tip at an intermediate portion thereof, and into which all of said gas passageways open, the wall of said chamber into which the inlet passageways open occupying a transverse plane and being provided with substantially radial grooves each intersecting one of the inlet passageway openings.

4. A torch tip of the class described comprising an elongated metal member having means at the rearward end thereof for attachment to a torch body through which oxygen and combustible gas may be fed to the tip, an axial oxygen passageway extending throughout the length of the tip, an annular series of combustion passageways in the forward portion of the tip and opening through discharge orifices in the front end of the tip, an annular series of gas inlet passageways in the rearward or shank portion of the tip, an annular chamber within the tip at an intermediate portion thereof, and into which all of said gas passageways open, the wall of said chamber into which the inlet passageways open occupying a transverse plane and being provided with substantially radial grooves each intersecting one of the inlet passageway openings, said wall also being provided at each point of intersection with another groove extending substantially at right angles to the radial groove at that point.

5. A torch tip of the class described comprising an elongated metal member having means at the rearward end thereof for attachment to a torch body through which oxygen and combustible gas may be fed to the tip, an annular series of combustion passageways in the forward portion of the tip and opening through discharge orifices in the front end of the tip, an annular series of gas inlet passageways in the rearward or shank portion of the tip, an annular chamber within the tip at an intermediate portion thereof, and into which all of said gas passageways open, the wall of said chamber into which the inlet passageways open occupying a transverse plane, and a plurality of intersecting grooves formed in said wall adjacent each of the openings of said inlet passage, said openings coinciding with the points of intersection of said grooves.

ALEXANDER F. JENKINS.